US011165519B2

(12) United States Patent
Dion et al.

(10) Patent No.: US 11,165,519 B2
(45) Date of Patent: Nov. 2, 2021

(54) INTERACTIVE LOGICAL VISUALIZATION OF INTERACTIONS BETWEEN WI-FI ACCESS POINTS

(71) Applicant: Nokia Solutions and Networks Oy, Espoo (FI)

(72) Inventors: Gino Dion, Quispamsis (CA); Steve Boutilier, Lower Sackville (CA); Chris McAloney, Halifax (CA); Colin MacKenzie, Largo, FL (US); Ertugrul Akyurek, Dubai (AE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/601,276

(22) Filed: Oct. 14, 2019

(65) Prior Publication Data

US 2021/0111815 A1    Apr. 15, 2021

(51) Int. Cl.
*H04B 17/23* (2015.01)
*H04B 17/318* (2015.01)
(Continued)

(52) U.S. Cl.
CPC .......... *H04B 17/23* (2015.01); *H04B 7/0617* (2013.01); *H04B 17/318* (2015.01); *H04B 17/336* (2015.01)

(58) Field of Classification Search
CPC . H04W 72/082; H04W 24/10; H04W 72/085; H04W 16/14; H04W 24/08; H04W 72/0453; H04W 88/08; H04W 52/243; H04W 24/02; H04W 52/241; H04W 72/048; H04W 72/1231; H04W 28/0236; H04W 72/0446; H04W 92/20; H04W 40/12; H04W 88/085; H04W 16/28;
(Continued)

(56) References Cited

U.S. PATENT DOCUMENTS

| 2002/0082004 A1* | 6/2002 | Sakai | H04W 16/18 |
| | | | 455/423 |
| 2003/0123420 A1* | 7/2003 | Sherlock | H04W 24/00 |
| | | | 370/338 |

(Continued)

OTHER PUBLICATIONS

Extended European Search Report dated Jan. 26, 2021 for European Application No. 20191577.4, 11 pages.

*Primary Examiner* — Kwasi Karikari
(74) *Attorney, Agent, or Firm* — Tong, Rea, Bentley & Kim, LLC

(57) ABSTRACT

A controller for a wireless communication system including multiple access points includes a processor that determines measures of mutual interference between the access points based on first information received from the access points. The processor also generates second information representing a logical visualization of the access points and the mutual interference. The controller includes a transceiver that provides the second information to an interactive display device that displays the logical visualization based on the second information. The interactive display device provides third information to the transceiver that indicates modifications to the logical visualization made by a user via the interactive display device. The processor reconfigures one or more of the access points based on the third information.

29 Claims, 7 Drawing Sheets

(51) Int. Cl.
*H04B 17/336* (2015.01)
*H04B 7/06* (2006.01)

(58) Field of Classification Search
CPC ..... H04W 16/32; H04W 24/06; H04W 36/20; H04W 72/04; H04W 72/0413; H04W 72/042; H04W 72/0433; H04W 16/10; H04W 40/16; H04W 48/16; H04W 4/02; H04W 4/023; H04W 4/029; H04W 52/367; H04W 52/383; H04W 64/00; H04W 64/003; H04W 72/0406; H04W 84/105; H04W 84/12; H04W 12/00516; H04W 16/00; H04W 16/18; H04W 28/18; H04W 36/165; H04W 40/34; H04W 48/14; H04W 4/025; H04W 72/12; H04W 74/08; H04W 74/0816; H04W 84/045; H04W 88/02; H04W 88/04; H04W 88/14; H04W 92/02; H04B 17/345; H04B 2001/1045; H04B 1/7097; H04B 2001/1054; H04B 15/00; H04B 17/00; H04B 17/21; H04B 17/391; H04B 1/7103; H04B 2001/7154; H04B 2201/709709; H04B 2201/709745; H04B 17/18; H04B 17/354; H04B 1/0475; H04B 1/1027; H04B 1/14; H04B 7/043
See application file for complete search history.

(56) References Cited

U.S. PATENT DOCUMENTS

| | | | |
|---|---|---|---|
| 2006/0019679 A1* | 1/2006 | Rappaport | G01S 5/0252 455/456.5 |
| 2007/0263587 A1* | 11/2007 | Savoor | H04W 52/24 370/346 |
| 2009/0059814 A1 | 3/2009 | Nixon et al. | |
| 2010/0246483 A1* | 9/2010 | Erceg | H04W 72/0426 370/328 |
| 2011/0090885 A1* | 4/2011 | Safavi | H04W 72/082 370/338 |
| 2016/0100320 A1 | 4/2016 | Dayanandan et al. | |
| 2017/0272965 A1 | 9/2017 | Kumar et al. | |

* cited by examiner

INTERACTIVE LOGICAL VISUALIZATION OF INTERACTIONS BETWEEN WI-FI ACCESS POINTS

BACKGROUND

Wireless communication systems include access points that provide wireless connectivity according to the Wi-Fi standards, which are a subset of the IEEE 802 family of standards. For example, the medium access control (MAC) and physical layer (PHY) specifications for Wi-Fi access points are defined by IEEE 802.11 for transmitting and receiving data in frequency bands such as infrared, 2.4 gigahertz (GHz), 3.6 GHz, 5 GHz, 60 GHz, and the like. Wi-Fi is used to provide network access to devices that are within range of one or more access points, which are also referred to as hotspots. The geographic area covered by a Wi-Fi hotspot ranges from several square feet to many square kilometers. Wi-Fi service is provided by organizations and businesses, such as airports, hotels, and restaurants. Users that receive network access from an Internet service provider (ISP) frequently install one or more access points to provide coverage within their home or apartment. Thus, Wi-Fi coverage has become nearly ubiquitous, particularly in densely populated areas. The increase in Wi-Fi coverage also increases the mutual interference between access points. For example, an access point that provides connectivity to an associated user (e.g., a user that has the password for a secure access point) can also generate interference for other users that are not associated with the access point, e.g., a user that does not have the password for the secure access point or a user that is associated with a different access point.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, an apparatus is provided. Some embodiments of the apparatus include a processor to determine measures of mutual interference between access points based on first information received from the access points and configured to generate second information representing a logical visualization of the access points and the mutual interference. The method also includes a transceiver to provide the second information to an interactive display device that displays the logical visualization based on the second information and provides third information to the transceiver that indicates modifications to the logical visualization made by a user via the interactive display device. The processor reconfigures at least one of the access points based on the third information.

Some embodiments of the transceiver are configured to acquire the first information by at least one of polling the access points or pulling the first information from the access points at predetermined times within a time interval.

In some embodiments, the first information includes at least one of a transmission signal strength, a received signal strength, an interference level, and a beamforming parameter acquired from the access points.

In some embodiments, the transceiver acquires the first information for at least one frequency, band, or channel supported by the access points.

In some embodiments, the transceiver acquires the first information from friendly access points that are controlled by a common operator or service provider.

In some embodiments, the transceiver is configured to acquire the first information from at least one user equipment served by the access points.

In some embodiments, the first information comprises at least one indication of received signal strength measured by the at least one user equipment and usage information associated with the at least one user equipment.

In some embodiments, the second information includes second information indicating at least one of a service set identifier (SSID), a frequency or channel, an interference level, a signal strength, and an airtime availability.

In some embodiments, the third information indicates modifications to the logical visualization resulting from at least one of the user dragging an icon that represents one of the access points to a new location within the logical visualization, the user modifying a shape of a contour representing mutual interference between two of the access points, and the user modifying a shape of a contour representing a coverage area of one of the access points.

In some embodiments, the processor is configured to generate, based on the third information, fourth information indicating a modification of at least one of a transmission signal strength, a channel, a channel width, a guard time interval, and a beamforming parameter used by the at least one of the access points.

In some embodiments, the transceiver is configured to transmit the fourth information to the at least one of the access points, and wherein reception of the fourth information causes reconfiguration of at least one of the transmission signal strength, the channel, the channel width, the guard time interval, and the beamforming parameter used by the at least one of the access points.

In some embodiments, a method is provided. The method includes determining measures of mutual interference between access points in a wireless communication system based on first information received from the access points. The method also includes generating a logical visualization of the access points and the mutual interference for display on an interactive display device. The method further includes reconfiguring at least one of the access points in response to modifications to the logical visualization made by a user via the interactive display device.

Some embodiments of the method include polling the access points to acquire the first information or pulling the first information from the access points at predetermined times within a time interval.

In some embodiments, the first information includes at least one of a transmission signal strength, a received signal strength, an interference level, and the beamforming parameter.

In some embodiments, the first information includes first information acquired for at least one frequency, band, or channel supported by the access point.

Some embodiments of the method include acquiring the first information from at least one user equipment served by the access points.

In some embodiments, the first information includes at least one of an indication of received signal strength measured by the at least one user equipment and usage information associated with the at least one user equipment.

In some embodiments, determining the measures of mutual interference includes determining the measures of mutual interference based on the first information received from friendly access points that are controlled by a common operator or service provider.

In some embodiments, generating the logical visualization includes generating a logical visualization indicating at least one of a service set identifier (SSID), a frequency or channel, an interference level, a signal strength, and an airtime availability.

In some embodiments, reconfiguring the at least one of the access points includes reconfiguring the at least one of the access points in response to modifications to the logical visualization resulting from at least one of the user dragging an icon that represents one of the access points to a new location within the logical visualization, the user modifying a shape of a contour representing mutual interference between two of the access points, and the user modifying a shape of a contour representing a coverage area of one of the access points.

In some embodiments, reconfiguring the at least one of the access points includes modifying at least one of a transmission signal strength, a channel, a channel width, a guard time interval, and a beamforming parameter used by the at least one of the access points.

In some embodiments, an apparatus is provided. The apparatus includes an interactive display device configured to display a logical visualization of access points in a wireless communication system and mutual interference between the access points. The interactive display device is configured to modify the logical visualization in response to input from a user. The apparatus also includes a processor configured to cause reconfiguration of at least one of the access points in response to a modification of the logical visualization.

In some embodiments, the processor is configured to determine measures of the mutual interference between the access points based on information received from at least one of the access points and user equipment served by the access points.

In some embodiments, the processor is configured to determine the measures of the mutual interference based on at least one of a transmission signal strength, a received signal strength, an interference level, and a beamforming parameter acquired from the access points.

In some embodiments, the processor reconfigures the at least one of the access points in response to at least one of the user dragging an icon that represents one of the access points to a new location within the logical visualization, the user modifying a shape of a contour representing mutual interference between two of the access points, and the user modifying a shape of a contour representing a coverage area of one of the access points.

In some embodiments, the processor reconfigures the at least one of the access points by modifying at least one of a transmission signal strength, a channel, a channel width, a guard time interval, and a beamforming parameter used by the at least one of the access points.

In some embodiments, the interactive display devices configured to display a logical visualization indicating at least one of a service set identifier (SSID), a frequency or channel, an interference level, a signal strength, and an airtime availability.

Some embodiments of the apparatus include a transceiver configured to poll the access points to acquire information indicating the mutual interference between the access points.

Some embodiments of the apparatus include a transceiver configured to pull information indicating the mutual interference between the access points from the access points at predetermined times within a time interval.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
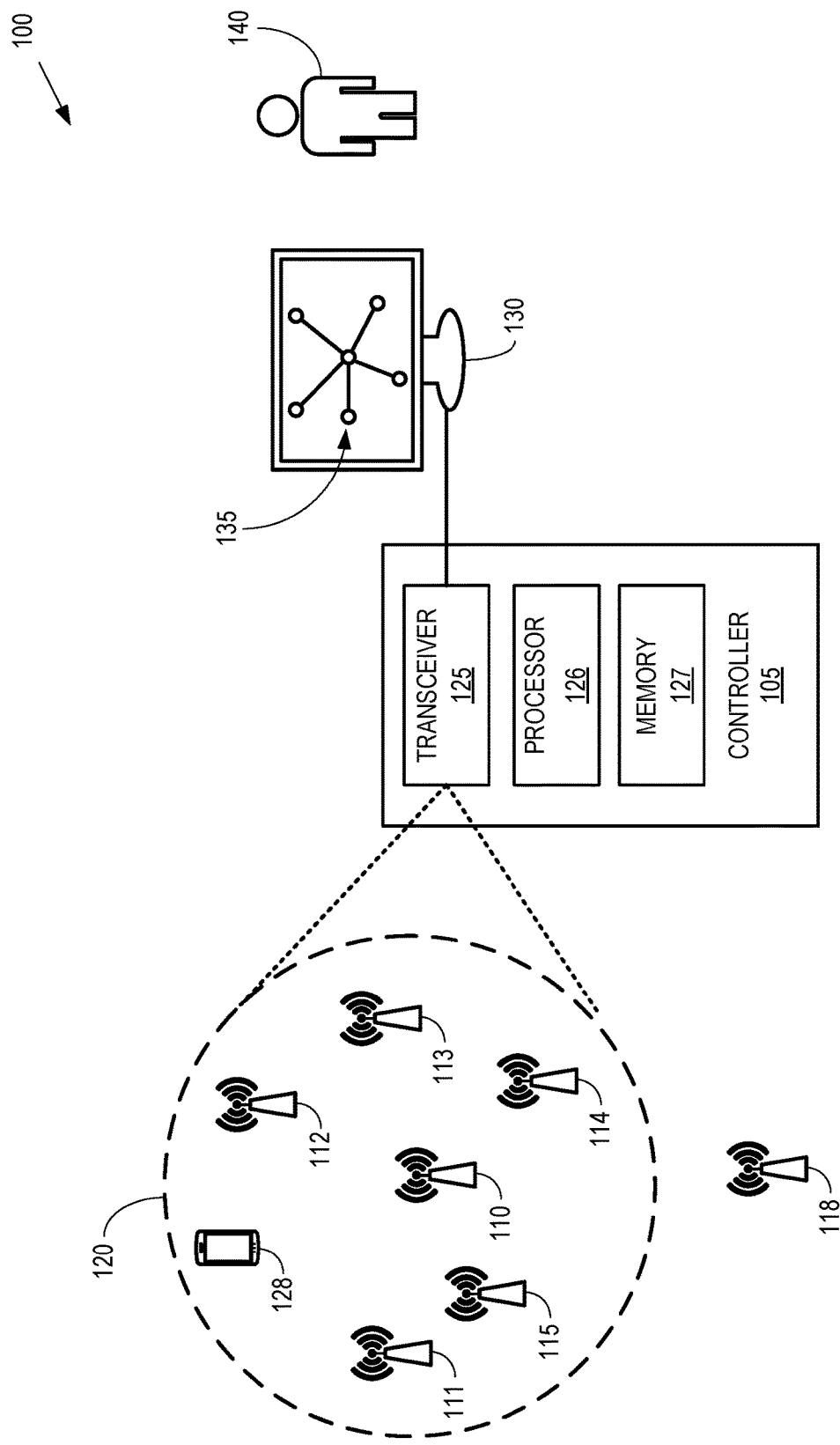
FIG. 1 is a block diagram of a communication system that implements interactive logical visualization of interactions between access points according to some embodiments.

Interference from other access points degrades the quality of communication between user equipment and an associated access point. The negative effects of the interference are exacerbated in ultra-dense residential areas such as multiple dwelling units (MDUs), apartment buildings, condominiums, university dorms, and the like. A single access point can detect dozens or even hundreds of potentially interfering network devices such as other access points, customer premises equipment (CPE), Wi-Fi mesh systems, Wi-Fi extenders, and other non-Wi-Fi interference sources. In some cases, the access points scan the available frequencies, channels, or bands periodically (or at boot up) to detect interference and identify the best and least used frequencies, channels, or bands for establishing connections with user equipment. However, the information provided to an access point by periodic scans is typically insufficient to determine an optimal configuration of the access point in the complex environment produced by numerous mutually interfering access points. Access points can auto-configure in a self-preservation mode, but this approach does not support coordination between access points. Radio resource management performed at a cloud controller can analyze the performance of multiple access points and apply a set of rules and algorithms to take corrective action. However, these approaches do not allow an operator to visualize the Wi-Fi environment (or footprints of the individual access points) beyond a geographical, topology/network diagram, or heat map visualization. These methods also do not allow an operator to modify a configuration of the access points using the visualization of the network.

The Wi-Fi communication protocols implement clear channel assessment (CCA) techniques to reduce interference between transmissions by the different access points. For example, listen before talk (LBT) coexistence rules require that each access point monitors a channel (e.g., "listens") to detect energy on the channel prior to transmitting information on the channel. If the detected energy level is below a threshold level, the channel is considered clear and the access point is free to transmit on the channel for a predetermined time interval. If the detected energy level is above the threshold level, which indicates that the channel is not clear because another access point is transmitting on the channel, the listening access point backs off until the energy level falls below the threshold. Although CCA/LBT coexistence rules function well in most situations, the coexistence rules create problems in ultra-dense residential areas. For example, an ultra-dense residential area typically includes a large number of access points that compete for airtime and create numerous cross-talk collisions. All the colliding access points are forced to back-off and retry after the predetermined time interval, which leads to an inefficient allocation of the available airtime. Consequently, allocating the available airtime based only on measurements of the received signal strength (RSSI) between an access point and an end device is not effective in ultra-dense environments, even if the access point is providing excellent signal quality.

FIGS. 1-7 disclose embodiments of a logical visualization of an environment including multiple access points that is generated using information acquired from the access points. The logical visualization includes icons representing the access points and contours that indicate the coverage areas (or footprints or hotspots) of the access points. In some embodiments, the strength of the mutual interference between access points is indicated by a separation between the access points, an indication of merger or overlap between the corresponding contours, and the like. The logical visualization can also include service set identifier (SSID) names of the access points, frequencies or channels used by the access points, airtime availability of the channels supported by the access points, and the like. The information used to create the logical visualization is acquired from the access points by polling the access points or pulling data from the access points at predetermined times within a time interval. For example, the access points can be polled to collect performance information every 30 minutes over a time interval of two weeks. The information is acquired from the access points for the frequencies, bands, or channels supported by the access points. The information includes one or more of transmission signal strengths, received signal strengths from other access points or interference sources, beamforming parameters, and the like. In some embodiments, the information is acquired from friendly access points that are controlled by the same operator or service provider. Access points that are not controlled by the operator or service provider are referred to as non-friendly access points. In some embodiments, additional information is also acquired from the user equipment served by the access points such as measured signal strengths, usage patterns, and the like.

The logical visualization is a two-dimensional (2D) representation or a three-dimensional (3D) representation that is interactive and modifiable by an operator. In some embodiments, modifying the logical visualization includes moving one or more of the access points, e.g., by dragging the icon that represents the access point to a new location within the logical visualization. Modifying the logical visualization can also include modifying the shape of the contour that indicates the coverage area of the access point. Configuration parameters of the access points are modified in response to an operator modifying the logical visualization of the environment. Examples of configuration parameters that are modified in response to changes in the logical visualization include, but are not limited to, a signal strength, a channel, a channel width, a guard time interval, and a beamforming parameter.

FIG. 1 is a block diagram of a communication system 100 that implements interactive logical visualization of interactions between access points according to some embodiments. The communication system 100 includes a controller 105 and access points 110, 111, 112, 113, 114, 115, which are collectively referred to herein as "the access points 110-115." The controller 105 and the access points 110-115 are interconnected by a network (sometimes also referred to as a backbone) that is indicated by the dashed circle 120. The network 120 supports communication between the controller 105 and the access points 110-115. The network 120 is implemented using wired connections, wireless connections, or a combination thereof. In the illustrated embodiment, the access points 110-115 are friendly access points that are controlled by a common operator or service provider via the network 120. The communication system 100 also includes one or more unfriendly access points 118 that are not controlled by the common operator or service provider via the network 120. Signals transmitted by the unfriendly access points 118 interfere with signals that are transmitted or received by the access points 110-115.

The controller 105 includes a transceiver 125 for transmitting and receiving signals, e.g. over the network 120. Some embodiments of the transceiver 125 are implemented as a single integrated circuit (e.g., using a single ASIC or FPGA) or as a system-on-a-chip (SOC) that includes different modules for implementing the functionality of the transceiver 125. The controller 105 also includes a processor 126 and a memory 127. The processor 126 executes instructions stored in the memory 127 and stores information in the memory 127 such as the results of the executed instructions.

The controller 105 acquires status information from the access points 110-115. In some embodiments, the transceiver 125 receives the status information from the access points 110-115 via the network 120. The status information includes, but is not limited to, information indicating transmission signal strengths used by one or more of the access points 110-115 to transmit signals, received signal strengths indicating a strength of signals received by the access points 110-115 from other access points or user equipment (not shown in FIG. 1 in the interest of clarity), interference levels that indicate a strength of interference detected by the access points 110-115, beamforming parameters used by the access points 110-115 to transmit information preferentially in one or more directions indicated by the beamforming parameters, and the like. In some embodiments, the transceiver 125 acquires separate sets of status information for the different frequencies, bands, or channels supported by the access points 110-115. For example, the access point 110 can provide status information indicating signal strengths used to transmit on the different channels in a 2.4 gigahertz (GHz) band and a 5 GHz band. The transceiver 125 receives the status information in response to polling the access points 110-115 or pulling the status information from the access points 110-115 at predetermined times within a time interval.

In some embodiments, the transceiver 125 acquires additional status information from one or more user equipment 128 (only one shown in FIG. 1 in the interest of clarity) that are served by one or more of the access points 110-115. The user equipment 128 measures signal strengths received from one or more of the access points 110-115. The user equipment 128 can therefore provide indications of the received signal strength, e.g., an RSSI, to the transceiver 125. Usage information associated with the user equipment 128 can also be acquired by the transceiver 125, either directly from the user equipment 128 or from the access points 110-115 that serves the user equipment 128. Usage information for the user equipment 128 includes information indicating time intervals for transmission or reception, volumes of data that are transmitted or received, geographic locations of the user equipment 128, and the like.

The controller 105 uses the status information acquired from the access points 110-115 (and, in some embodiments, from the user equipment 128) to generate a logical visualization of the interactions between the access points 110-115. In some embodiments, the processor 126 generates information representing the logical visualization based on the status information. For example, the processor 126 can transform the status information into information representing mutual interference between the access points 110-115 on one or frequencies, bands, or channels. The information representing the logical visualization is provided to an interactive display device 130 that uses the information to render an image 135 of the logical visualization. Some embodiments of the interactive display device 130 include a touchscreen that allows a user to indicate portions of the image 135 and move these portions to other locations on the interactive display device 130, e.g., by "dragging" the portions of the image 135. Other examples of interactive display devices 130 include screens or monitors that interact with a user 140 via a mouse, a keyboard, a pointing device, a stylus, or similar device that allows the user 140 to select portions of the image 135 and cause these portions to be moved to other locations on the interactive display device 130.

The user 140 views the image 135 and decides whether to modify the image 135 to cause corresponding changes in the configuration of the access points 110-115. In some embodiments, the user 140 modifies the image 135 by dragging an icon that represents one of the access points to a new location within the image 135 of the logical visualization. The user 140 can also modify a shape of a contour representing mutual interference between two of the access points 110-115. The user can also modify a shape of a contour representing a coverage area of one of the access points 110-115. In response to the modifications indicated by the user 140, the processor 126 modifies parameters that configure one or more of the access points 110-115. Some embodiments of the processor 126 modify configuration parameters including, but not limited to, a signal strength of signals transmitted by one or more of the access points 110-115, a channel used for transmission by one or more of the access points 110-115, a channel width of one or more of the channels used for transmission by one or more of the access points 110-115, a guard time interval between transmissions by one or more of the access points 110-115, and a beamforming parameter used by one or more of the access points 110-115.

Figure 2:
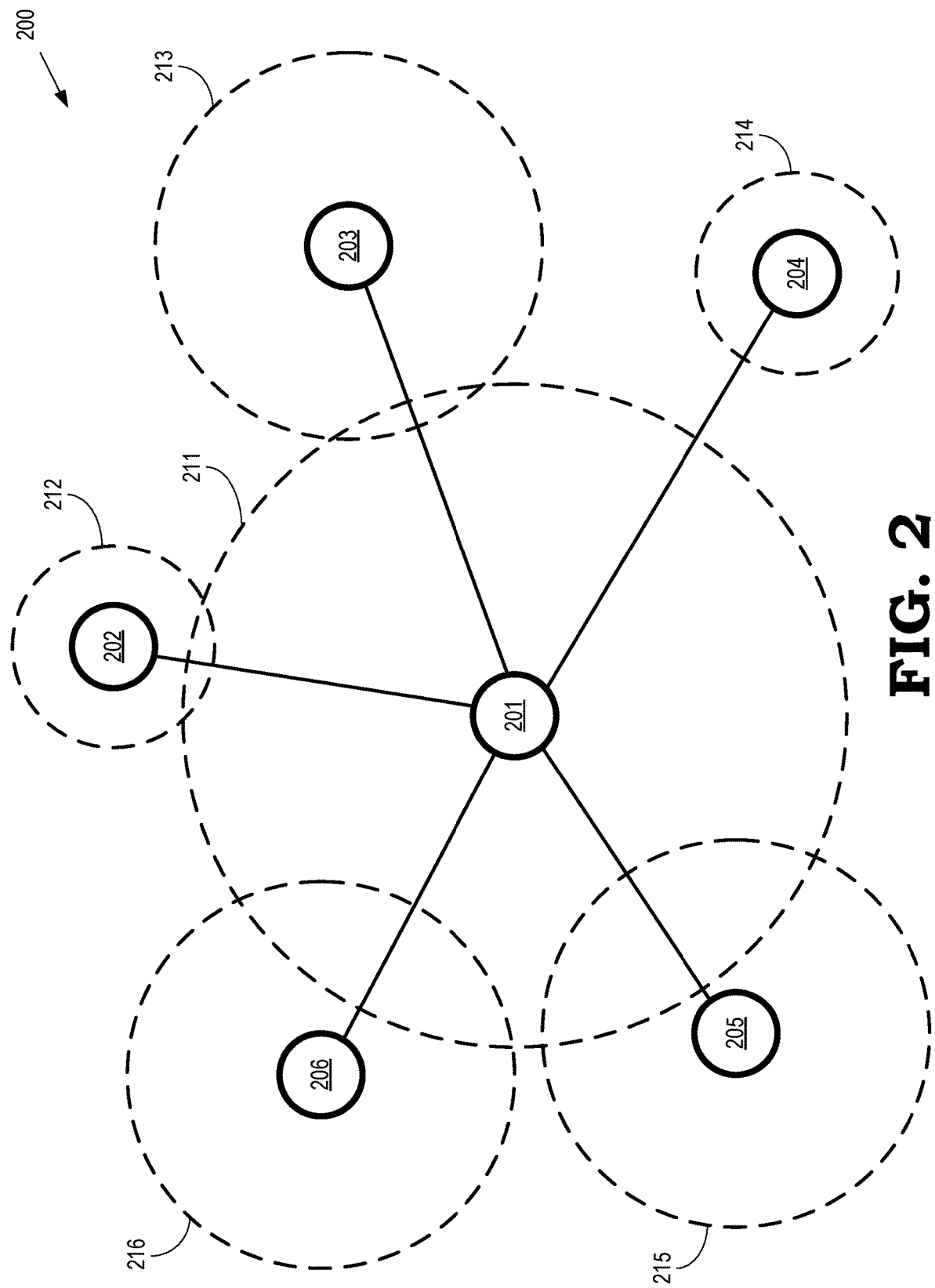
FIG. 2 is a block diagram of a first embodiment of a logical visualization of interactions between access points according to some embodiments.

FIG. 2 is a block diagram of a first embodiment of a logical visualization 200 of interactions between access points according to some embodiments. The logical visualization 200 represents some embodiments of the image 135 shown in FIG. 1. The logical visualization 200 represents interactions between a set of access points 201, 202, 203, 204, 205, 206, which are collectively referred to herein as "the access points 201-206." The access points 201-206 are represented by circular icons in FIG. 2, although any type of icon can be used to represent the access points 201-206. In the illustrated embodiment, the logical visualization 200 is generated by a controller such as the controller 105 shown in FIG. 1 and displayed on an interactive display device such as the interactive display device 130 shown in FIG. 1.

In the illustrated embodiment, signal strengths of the signals transmitted by the access points 201-206 are indicated by sizes (or radii) of corresponding contours 211, 212, 213, 214, 215, 216, which are collectively referred to herein as "the contours 211-216." For example, the signal strength of signals transmitted by the access point 201 is stronger than the signal strength of the signals transmitted by the access point 202, as indicated by the relative sizes of the contours 211 and 212, respectively. The strength of the interaction between the access points 201-206 is indicated by the separation of the centers of the corresponding icons and degrees of overlap between the contours 211-216. For example, the relative strength of the interaction between the access points 201 and 202 is larger than the relative strength of the interaction between the access points 201 and 204. Thus, the access point 202 is expected to cause relatively more interference at the access point 201 and the access point 204 is expected to cause relatively less interference at the access point 201. The strengths of signals transmitted by the access points 201-206 and strengths of the interactions between the access points 201-206 is determined by the configuration parameters used to configure the access points 201-206. As discussed in detail herein, a user can modify the logical visualization 200, which causes a corresponding modification in the configuration parameters of the access points 201-206.

Figure 3:
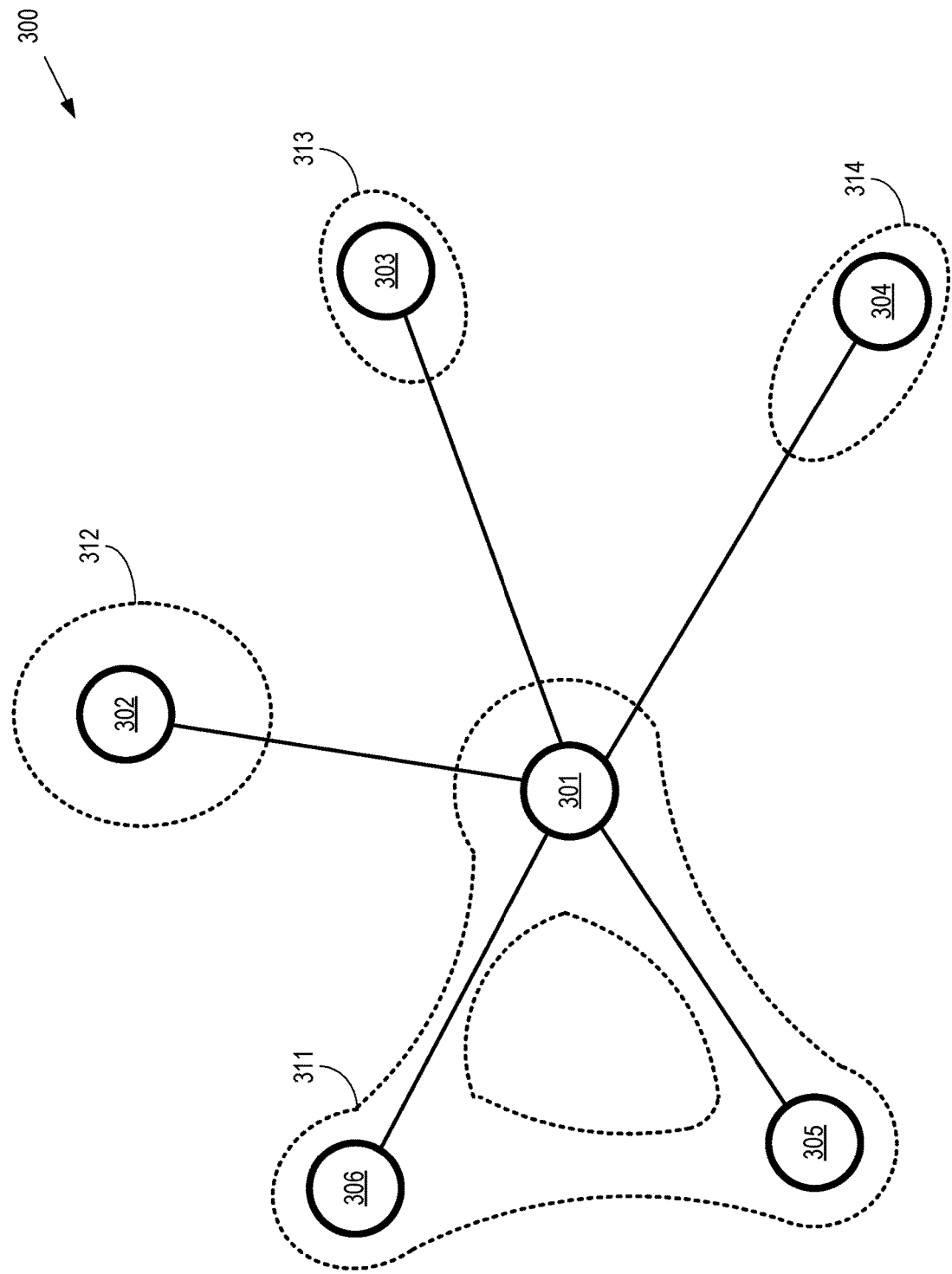
FIG. 3 is a block diagram of a second embodiment of a logical visualization of interactions between access points according to some embodiments.

FIG. 3 is a block diagram of a second embodiment of a logical visualization 300 of interactions between access points according to some embodiments. The logical visualization 300 represents some embodiments of the image 135 shown in FIG. 1. The logical visualization 300 represents interactions between a set of access points 301, 302, 303, 304, 305, 306, which are collectively referred to herein as "the access points 301-306." The access points 301-306 are represented by circular icons in FIG. 3, although any type of icon can be used to represent the access points 301-306. In the illustrated embodiment, the logical visualization 300 is generated by a controller such as the controller 105 shown in FIG. 1 and displayed on an interactive display device such as the interactive display device 130 shown in FIG. 1.

The mutual interactions between the access points 301-306 are represented by contours 311, 312, 313, 314, which are collectively referred to herein as "the contours 311-314." The degree of interaction between the access points as indicated by the shapes and connections between the contours 311-314. In the illustrated embodiment, the contour 311 indicates relatively strong degrees of interaction between the access point 301 and the access point 305. The contour 311 also indicates relatively strong degrees of interaction between the access point 301 and the access point 306, as well as between the access point 305 and the access point 306. The slight elongation of the contours 312, 313, 314 in the direction of the access point 301 indicates relatively weak degrees of interaction between the access point 301 and the access points 302, 303, 304. Thus, there are large amounts of mutual interference between the access points 301, 305, and 306, while the access points 302, 303, 304 generate relatively smaller amounts of interference at the access point 301.

Figure 4:
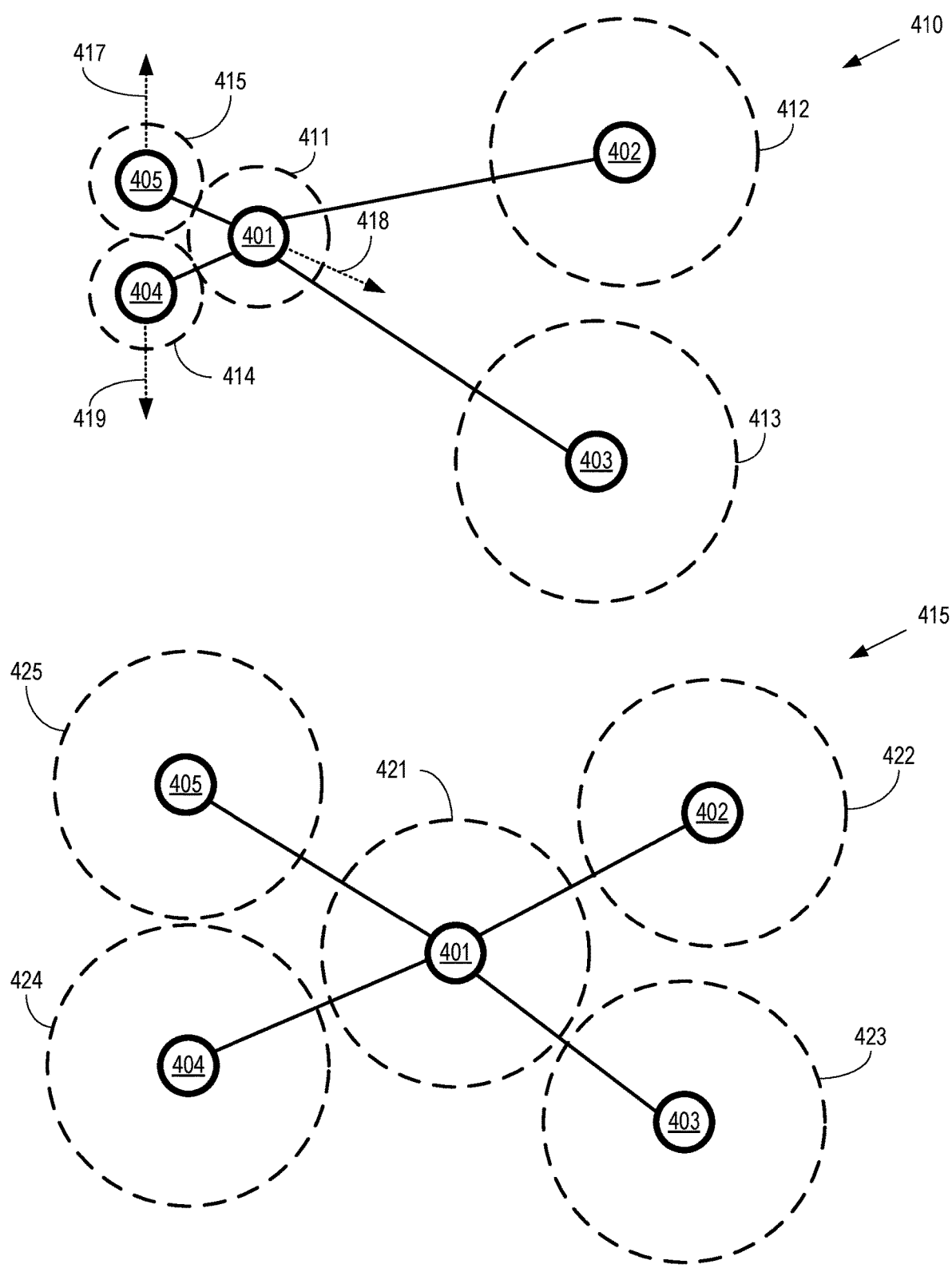
FIG. 4 is a block diagram illustrating user modifications to a logical visualization that are used to reconfigure access points according to some embodiments.

FIG. 4 is a block diagram illustrating user modifications to a logical visualization that are used to reconfigure access points according to some embodiments. A set of access points 401, 402, 403, 404, 405 (collectively referred to herein as "the access points 401-405") is represented in an initial configuration 410 and a modified configuration 415 that is determined based on user modifications to the initial configuration 410 of the logical visualization.

Contours 411, 412, 413, 414, 415 (collectively referred to herein as "the contours 411-415") and relative separations between the access points 401-405 indicate the relative strengths of the mutual interactions between the access points 401-405 in the initial configuration 410. A user viewing the logical visualization of the initial configuration 410 sees relatively strong interactions between the access points 401, 404, 405 and relatively weak interactions between the access points 401, 402, 403. The strong interactions between the access points 401, 404, 405 indicate large degrees of mutual interference between the access points 401, 404, 405, which leads to an inefficient allocation of airtime availability, e.g., as a result of crosstalk collisions as discussed herein. The user therefore modifies the initial configuration 410 by moving the icons that represent the access points 401, 404, 405. In the illustrated embodiment, the modifications performed by the user are indicated by the arrows 417, 418, 419.

The contours 421, 422, 423, 424, 425 (collectively referred to herein as "the contours 421-425") and relative separations between the access points 401-405 indicate the relative strengths of mutual interactions between the access points 401-405 in the modified configuration 415. Moving the access point 401 to a more central location in the logical visualization and moving the access points 404, 405 downwards and upwards, respectively, in the logical visualization reduces the mutual interaction between the access points 401, 404, 405. The modifications also allow the access points 401, 404, 405 to transmit at higher signal strengths, as indicated by the larger radii of the contours 421, 424, 425 in the modified configuration 415. The access points 401-405 are reconfigured with a set of configuration parameters that are determined based on the modified configuration 415, as discussed herein.

The icons that represent the access points 201-206 in FIG. 2, the access points 301-306 in FIG. 3, and the access points 401-405 in FIG. 4 are used to indicate a position within the corresponding logical visualizations. However, some embodiments of logical visualizations include icons that represent additional information such as airtime availability. As used herein, the term "airtime availability" is defined as a difference between total resources provided for communication over an air interface and a sum of the resources that are allocated for communication by the corresponding access point and resources that are consumed by interference at the access point. The airtime availability can be determined for all the resources of the access point, resources at different frequencies, resources in different frequency bands, resources on different channels, and the like.

Figure 5:
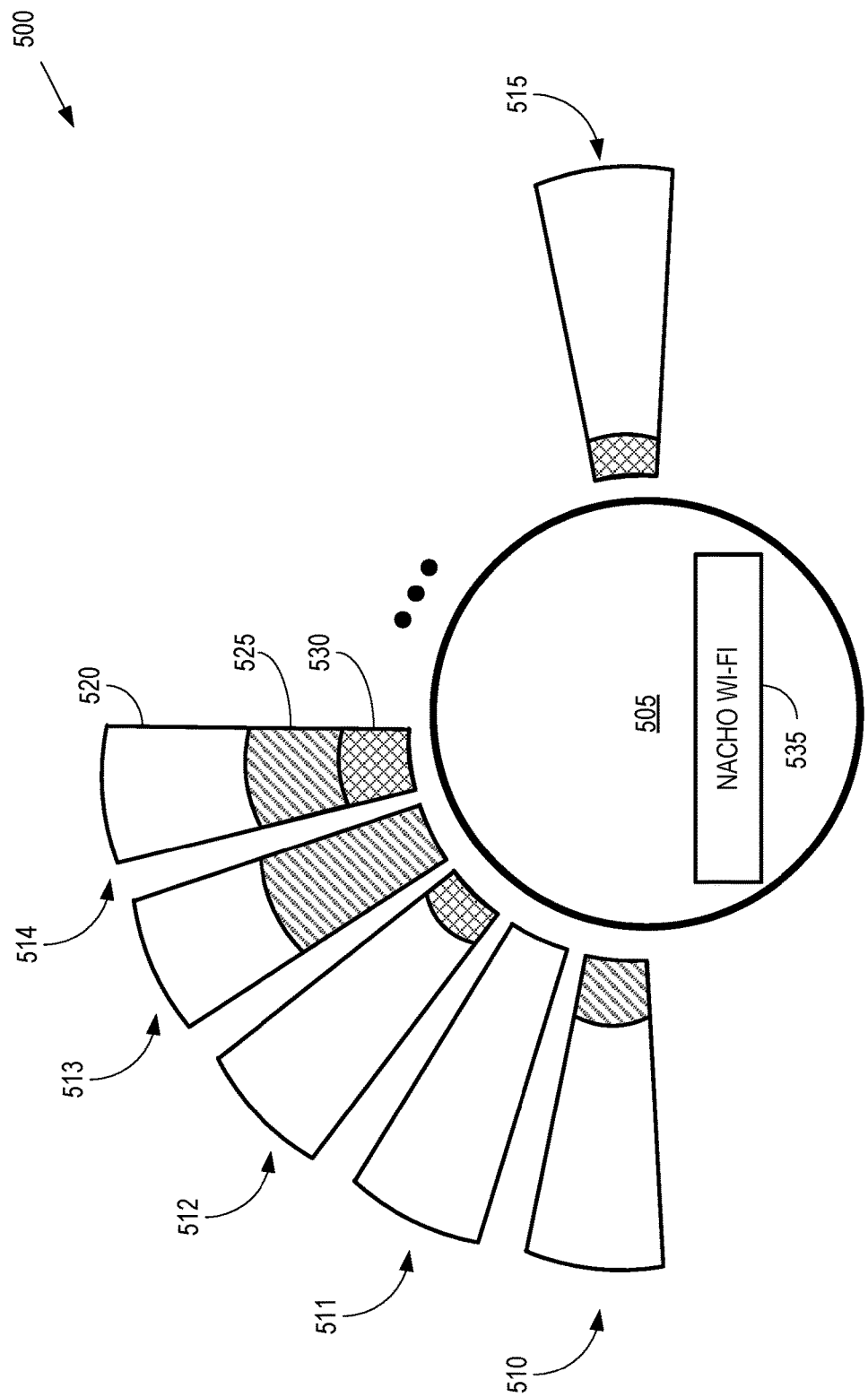
FIG. 5 is a block diagram of an icon that identifies an access point and status information associated with the access point according to some embodiments.

FIG. 5 is a block diagram of an icon 500 that identifies an access point and status information associated with the access point according to some embodiments. The icon 500 is used to represent some embodiments of the access points 201-206 in FIG. 2, the access points 301-306 in FIG. 3, and the access points 401-405 in FIG. 4 in the corresponding logical visualizations. The icon 500 includes a circle 505 that is used to represent a location of the corresponding access point in a logical visualization, e.g., a center of the circle 505 indicates the location of the corresponding access point. The icon 500 also includes a plurality of status bars 510, 511, 512, 513, 514, 515, which are collectively referred to herein as "the status bars 510-515." The status bars 510-515 are displayed as a heliograph that represents status information associated with the access points. In the illustrated embodiment, the status bars 510-515 are associated with channels used by the access point associated with the icon 500. For example, the status bars 510-515 can represent channels in a 2.4 GHz frequency band or a 5 GHz frequency band utilized by the access point.

The status bars 510-515 indicate a total resource available for allocation on the corresponding channel. In the illustrated embodiment, the resource indicated by the status bars 510-515 is the airtime available for allocation to a user equipment to support a call or a data stream. The overall size of the status bars 510-515 indicates the total airtime and the sections of the status bars 510-515 indicate the airtime availability (open portion), the usage of the airtime (hatched portion), and the detected interference (crosshatched portion). For example, the status bar 514 indicates an airtime availability 520, an airtime usage 525, and an interference level 530 for the corresponding channel of the frequency band represented by the heliograph. Users can use the information presented in the status bars 510-515 of the heliograph to determine how to modify the logical visualization and, by extension, how to reconfigure the access points. Some embodiments of the icon 500 include information indicating a service set identifier (SSID) 535, which in this case is "Nacho Wi-Fi."

Figure 6:
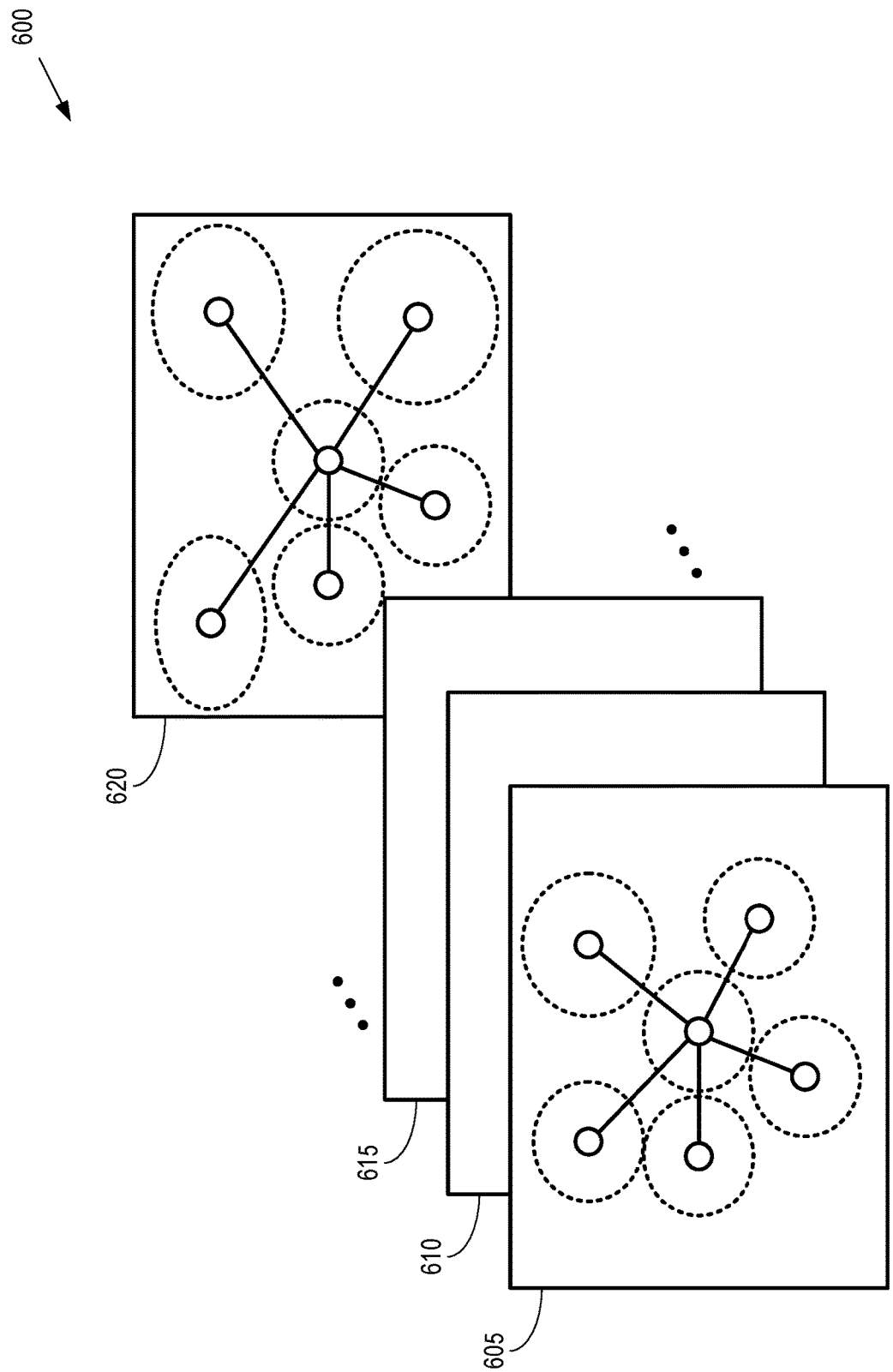
FIG. 6 is a block diagram of a set of logical visualizations corresponding to different frequencies, channels, or bands associated with an access point according to some embodiments.

FIG. 6 is a block diagram of a set 600 of logical visualizations corresponding to different frequencies, channels, or bands associated with an access point according to some embodiments. The set 600 is used to represent some embodiments of the image 135 that is displayed on the interactive display device 130 in FIG. 1. The set 600 includes logical visualizations 605, 610, 615, 620 that represent access points in a wireless communication system at the different frequencies, channels, or bands. A user can therefore modify one or more of the logical visualizations 605, 610, 615, 620 based on the representation in the corresponding frequency, channel, or band. For example, the user can modify the logical visualization 605 to cause a corresponding reconfiguration of parameters used by the access points to transmit or receive in the frequency, channel, or band represented by the logical visualization 605.

In some embodiments, the logical visualizations 605, 610, 615, 620 are substantially independent of each other, e.g., because there is little or no overlap between the frequencies, channels, or bands associated with the logical visualizations 605, 610, 615, 620. Modifications to the logical visualizations 605, 610, 615, 620 therefore cause reconfigurations of the frequencies, channels, or bands that are substantially independent of configuration/reconfigurations of the other frequencies, channels, or bands. In other embodiments, two or more of the logical visualizations 605, 610, 615, 620 depend at least partially upon each other, e.g., because of overlap between the frequencies, channels, or bands associated with the logical visualizations 605, 610, 615, 620. Modifications to the logical visualizations 605, 610, 615, 620 therefore cause reconfigurations of the frequencies, channels, or bands that are at least partially dependent on (or cause changes to) configuration/reconfigurations of the other frequencies, channels, or bands.

The logical visualizations depicted in FIGS. 1-6 are represented in a two-dimensional (2D) format in the interest of clarity. However, some embodiments of logical visualizations are represented in three dimensions. For example, mutual interactions between the access points in a multistory building are well represented by a three-dimensional (3D) structure so that interactions between access points on different floors are distinguished from interactions between access points on the same floor. In some embodiments, other types of interactive display devices are used to present the logical visualization to the user and receive input from the user. For example, virtual reality, augmented reality, or mixed reality devices such as head mounted devices, hand controllers, and the like can be used to represent a 3D logical visualization, allow the user to "move" through the 3D logical visualization, and receive input from the user indicating modifications to the 3D logical visualization, which result in changes to the configuration of the corresponding access points.

Figure 7:
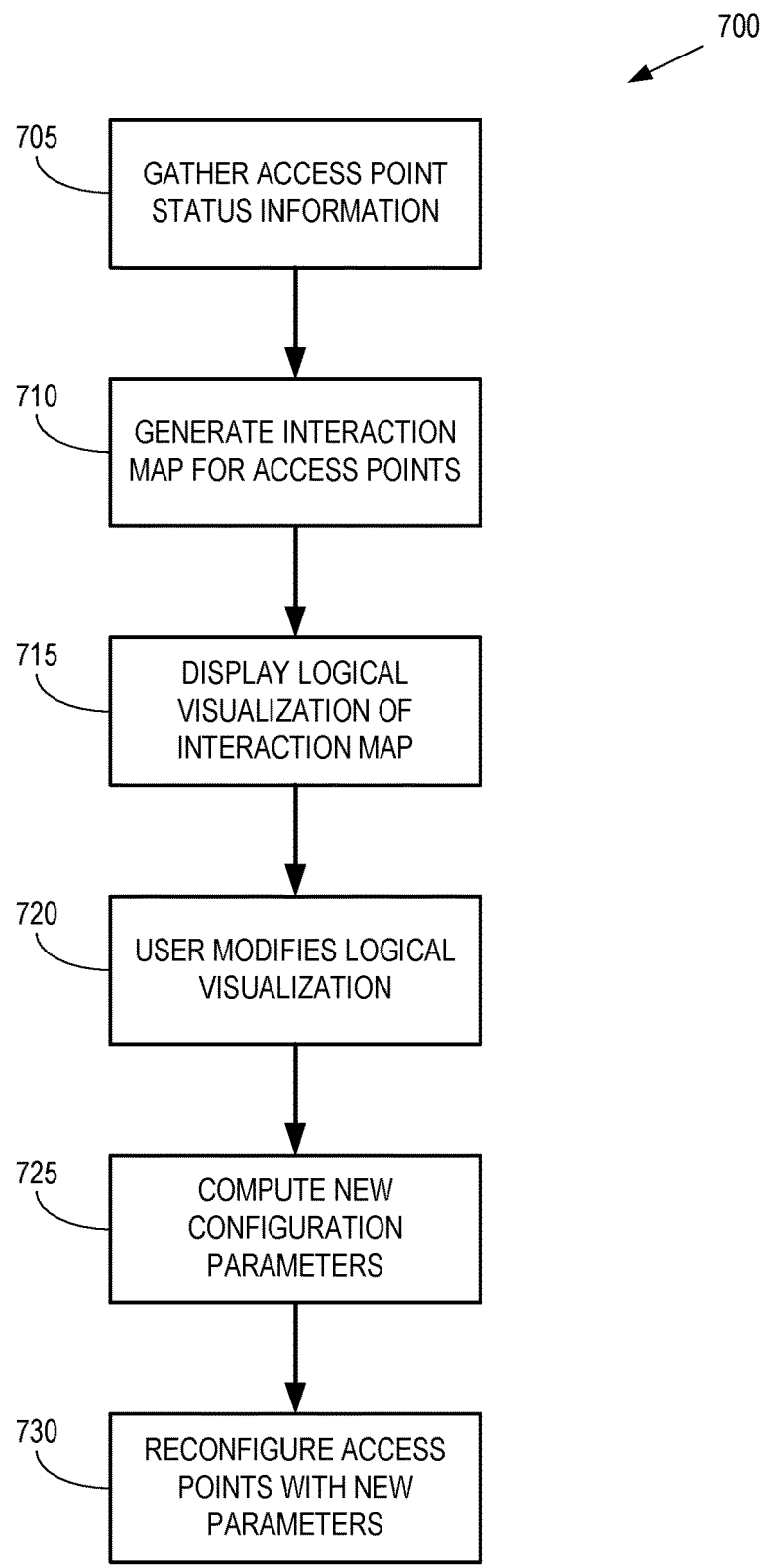
FIG. 7 is a flow diagram of a method for reconfiguring a set of access points via interaction with a logical visualization of mutual interference between the access points according to some embodiments.

FIG. 7 is a flow diagram of a method 700 for reconfiguring a set of access points via interaction with a logical visualization of mutual interference between the access points according to some embodiments. The method 700 is implemented in some embodiments of the communication system 100 shown in FIG. 1.

At block 705, a controller such as the controller 105 shown in FIG. 1 gathers status information from the set of access points. In some embodiments, the controller polls the access points, by sending requests to the access points at different times within a time interval. In response to receiving the poll, the access points transmit the requested status information to the controller. Some embodiments of the controller pull the status information from the access points at predetermined times within a time interval. The status information indicates transmission or reception parameters used to configure the access points. For example, the status information can include a transmission signal strength used to transmit downlink signals from the access point, a received signal strength for uplink signals received at the access point from other access points or user equipment, an interference level that indicates how much interference is being received at the access point from other sources, and a beamforming parameter that indicates any directionality to the downlink signals transmitted by the access points. The status information represents parameters for transmission or reception in a frequency, band, or channel supported by the access points. In some embodiments, the controller acquires the status information from friendly access points that are controlled by a common operator or service provider. The status information can also include information received from (or associated with) one or more user equipment that are served by the access points. In some embodiments the status information associated with the user equipment includes indications of received signal strengths measured by the user equipment, usage of airtime resources by the user equipment, and the like.

At block 710, the controller generates an interaction map for the access points based on the acquired status information. The interaction map indicates the relative strength of mutual interactions between the access points. In some cases, separate interaction maps are generated for different frequencies, channels, or bands, as discussed herein.

At block 715, the controller displays (or causes to be displayed) a logical visualization of the interaction map for the access points. The logical visualization represents the mutual interactions in terms of contours and separations between icons that represent the access points, e.g., as shown in FIGS. 2-6. The logical visualization is displayed on an interactive display device that displays a representation of the logical visualization and allows a user to modify the representation by interacting with the interactive display device.

At block 720, the user modifies the representation of the logical visualization by interacting with the interactive display device. In some embodiments, the user modifies the logical visualization by performing touchscreen operations such as dragging an icon that represents one of the access points to a new location within the logical visualization, modifying a shape of a contour representing mutual interference between two of the access points, and modifying a shape of a contour representing a coverage area of one of the access points.

At block 725, the controller computes new configuration parameters for one or more of the access points based on the modifications to the logical visualization. In some embodiments, the new (or modified) configuration parameters include modified transmission signal strengths for downlink signals, parameters indicating a switch from one channel to another channel, increasing or decreasing a channel width, increased or decreased guard time intervals, or modified beamforming parameters that are selected to change a shape of a transmission or reception beam for one or more of the access points.

At block 730, the controller reconfigures (or causes to be reconfigured) one or the access points using the new or modified configuration parameters. In some embodiments, the controller transmits an instruction message to the access points. The instruction message identifies the access points that are to be reconfigured and provides the corresponding new or modified configuration parameters. The access points that are identified in the instruction message perform the reconfiguration using the new or modified configuration parameters.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
a) hardware-only circuit implementations (such as implementations and only analog and/or digital circuitry) and
b) combinations of hardware circuits and software, such as (as applicable):
i. a combination of analog and/or digital hardware circuit(s) with software/firmware and
ii. any portions of a hardware processor(s) with software (including digital signal processor(s), software, and memory(ies) that work together to cause an apparatus, such as a mobile phone or server, to perform various functions) and
c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
   at least one processor; and
   at least one memory including a set of instructions;
   wherein the set of instructions is configured to, when executed by the at least one processor, cause the apparatus to:
   determine measures of mutual interference between access points based on first information received from the access points;
   generate second information representing a logical visualization of the access points and the mutual interference;
   provide the second information to an interactive display device that displays the logical visualization based on the second information;
   receive third information that indicates modifications to the logical visualization made by a user via the interactive display device; and
   reconfigure at least one of the access points based on the third information.

2. The apparatus of claim 1, wherein the first information is acquired by at least one of polling the access points or pulling the first information from the access points at predetermined times within a time interval.

3. The apparatus of claim 2, wherein the first information comprises at least one of a transmission signal strength, a received signal strength, an interference level, and a beamforming parameter acquired from the access points.

4. The apparatus of claim 2, wherein the first information is acquired for at least one frequency, band, or channel supported by the access points.

5. The apparatus of claim 2, wherein the first information is acquired from friendly access points that are controlled by a common operator or service provider.

6. The apparatus of claim 1, wherein the first information is acquired from at least one user equipment served by the access points.

7. The apparatus of claim 6, wherein the first information comprises at least one of an indication of received signal strength measured by the at least one user equipment and usage information associated with the at least one user equipment.

8. The apparatus of claim 1, wherein the second information comprises information indicating at least one of a service set identifier (SSID), a frequency or channel, an interference level, a signal strength, and an airtime availability.

9. The apparatus of claim 1, wherein the third information indicates modifications to the logical visualization resulting from at least one of the user dragging an icon that represents one of the access points to a new location within the logical visualization, the user modifying a shape of a contour representing mutual interference between two of the access points, and the user modifying a shape of a contour representing a coverage area of one of the access points.

10. The apparatus of claim 1, wherein the set of instructions is configured to, when executed by the at least one processor, cause the apparatus to:
    generate, based on the third information, fourth information indicating a modification of at least one of a transmission signal strength, a channel, a channel width, a guard time interval, and a beamforming parameter used by the at least one of the access points.

11. The apparatus of claim 10, wherein the set of instructions is configured to, when executed by the at least one processor, cause the apparatus to:
  transmit the fourth information toward the at least one of the access points to cause reconfiguration of at least one of the transmission signal strength, the channel, the channel width, the guard time interval, and the beamforming parameter used by the at least one of the access points.

12. A method comprising:
  determining measures of mutual interference between access points in a wireless communication system based on first information received from the access points;
  generating a logical visualization of the access points and the mutual interference for display on an interactive display device; and
  reconfiguring at least one of the access points in response to modifications to the logical visualization made by a user via the interactive display device.

13. The method of claim 12, further comprising at least one of:
  polling the access points to acquire the first information; and
  pulling the first information from the access points at predetermined times within a time interval.

14. The method of claim 12, wherein the first information comprises at least one of a transmission signal strength, a received signal strength, an interference level, and the beamforming parameter.

15. The method of claim 12, wherein the first information comprises information acquired for at least one frequency, band, or channel supported by the access point.

16. The method of claim 12, further comprising:
  acquiring the first information from at least one user equipment served by the access points.

17. The method of claim 16, wherein the first information comprises at least one of an indication of received signal strength measured by the at least one user equipment and usage information associated with the at least one user equipment.

18. The method of claim 12, wherein determining the measures of mutual interference comprises determining the measures of mutual interference based on the first information received from friendly access points that are controlled by a common operator or service provider.

19. The method of claim 12, wherein generating the logical visualization comprises generating a logical visualization indicating at least one of a service set identifier (SSID), a frequency or channel, an interference level, a signal strength, and an airtime availability.

20. The method of claim 12, wherein reconfiguring the at least one of the access points comprises reconfiguring the at least one of the access points in response to modifications to the logical visualization resulting from at least one of the user dragging an icon that represents one of the access points to a new location within the logical visualization, the user modifying a shape of a contour representing mutual interference between two of the access points, and the user modifying a shape of a contour representing a coverage area of one of the access points.

21. The method of claim 12, wherein reconfiguring the at least one of the access points comprises modifying at least one of a transmission signal strength, a channel, a channel width, a guard time interval, and a beamforming parameter used by the at least one of the access points.

22. An apparatus comprising:
  an interactive display device configured to display a logical visualization of access points in a wireless communication system and mutual interference between the access points, wherein the interactive display device is configured to modify the logical visualization in response to input from a user; and
  a processor configured to cause reconfiguration of at least one of the access points in response to a modification of the logical visualization.

23. The apparatus of claim 22, wherein the processor is configured to determine measures of the mutual interference between the access points based on information received from at least one of the access points and user equipment served by the access points.

24. The apparatus of claim 23, wherein the processor is configured to determine the measures of the mutual interference based on at least one of a transmission signal strength, a received signal strength, an interference level, and a beamforming parameter acquired from the access points.

25. The apparatus of claim 22, wherein the processor is configured to cause the reconfiguration of the at least one of the access points in response to at least one of the user dragging an icon that represents one of the access points to a new location within the logical visualization, the user modifying a shape of a contour representing mutual interference between two of the access points, and the user modifying a shape of a contour representing a coverage area of one of the access points.

26. The apparatus of claim 25, wherein the processor is configured to cause the reconfiguration of the at least one of the access points by modifying at least one of a transmission signal strength, a channel, a channel width, a guard time interval, and a beamforming parameter used by the at least one of the access points.

27. The apparatus of claim 22, wherein the interactive display device is configured to display a logical visualization indicating at least one of a service set identifier (SSID), a frequency or channel, an interference level, a signal strength, and an airtime availability.

28. The apparatus of claim 22, wherein the processor is configured to:
  poll the access points to acquire information indicating the mutual interference between the access points.

29. The apparatus of claim 22, wherein the processor is configured to:
  pull information indicating the mutual interference between the access points from the access points at predetermined times within a time interval.

* * * * *